United States Patent [19]

Nakaya et al.

[11] Patent Number: 4,652,437
[45] Date of Patent: Mar. 24, 1987

[54] PROCESS FOR PRODUCING ANHYDROUS SODIUM CARBONATE

[75] Inventors: Keiichi Nakaya, Chiba; Kunio Tanaka; Koichi Yokoyama, both of Ichihara, all of Japan

[73] Assignee: Asahi Glass Company, Ltd., Tokyo, Japan

[21] Appl. No.: 650,503

[22] Filed: Sep. 14, 1984

[30] Foreign Application Priority Data

Sep. 20, 1983 [JP] Japan ................................ 58-172151

[51] Int. Cl.⁴ .......................... C01D 7/00; C01D 7/14; C01D 7/37
[52] U.S. Cl. .................................. 423/421; 423/425; 423/427; 423/206 T
[58] Field of Search ............... 423/421, 422, 425, 427, 423/206 T

[56] References Cited

U.S. PATENT DOCUMENTS

| | | | |
|---|---|---|---|
| 439,330 | 10/1890 | Staub | 423/427 |
| 1,503,481 | 8/1924 | Cocksedge | 423/427 |
| 1,583,663 | 5/1926 | Sundstrum et al. | 423/427 |
| 1,911,794 | 5/1933 | Britton | 423/425 |
| 2,038,025 | 4/1936 | Cunningham et al. | 423/425 |
| 3,028,215 | 4/1962 | Frint | 423/427 |
| 3,328,130 | 6/1967 | Gancy | 423/425 |
| 3,944,500 | 3/1976 | Gancy et al. | 423/425 |
| 3,984,527 | 10/1976 | Gancy et al. | 423/425 |
| 4,252,781 | 2/1981 | Fujita et al. | 423/421 |

FOREIGN PATENT DOCUMENTS

| | | | |
|---|---|---|---|
| 210628 | 2/1924 | United Kingdom | 423/425 |
| 765602 | 1/1957 | United Kingdom | 423/427 |

Primary Examiner—Gary P. Straub
Attorney, Agent, or Firm—Oblon, Fisher, Spivak, McClelland & Maier

[57] ABSTRACT

A process for producing anhydrous sodium carbonate by the pyrolysis of wet sodium bicarbonate, which comprises (a) a step of forming a complex salt selected from the group consisting of $Na_2CO_3.3NaHCO_3$ and $Na_2CO_3.NaHCO_3.2H_2O$ by the pyrolysis of wet sodium bicarbonate under such temperature and pressure conditions that said complex salt is stable, and (b) a step of forming anhydrous sodium carbonate by the pyrolysis of said complex salt under such temperature and pressure conditions that the anhydrous sodium carbonate is stable.

7 Claims, 4 Drawing Figures

A : NaHCO₃
B : Na₂CO₃·3NaHCO₃
C : Na₂CO₃·NaHCO₃·2H₂O
D : Na₂CO₃
E : Na₂CO₃·H₂O

PROCESS FOR PRODUCING ANHYDROUS SODIUM CARBONATE

BACKGROUND OF THE INVENTION

Field of the Invention

The present invention relates to a process for producing anhydrous sodium carbonate. More particularly, it relates to a process for producing anhydrous sodium carbonate readily in high yield and with minimum consumption of heat energy by using, as a starting material, a crude sodium bicarbonate obtained by a so-called ammonium chloride-soda coproduction method wherein ammonium chloride and sodium bicarbonate are precipitated alternately, or by a so-called ammonia-soda method wherein only sodium bicarbonate is precipitated and ammonium chloride is subjected to distillation to recover and recycle ammonia.

Anhydrous sodium carbonate is widely used as a material for various industrial reagents or pharmaceuticals.

Reflecting the low level of economical development in recent years, the necessity for the conservation of fuel materials, particularly for the saving of energy, is emphasized in the industrial fields. Under such circumstances, it is required also in this particular field to cut down the costs as far as possible to improve the profit margin. For such a purpose, it is effective to improve the yield and to save energy. From such a viewpoint, there has been proposed, for instance, a method wherein sodium bicarbonate and/or sodium sesquicarbonate is suspended in a highly concentrated sodium carbonate solution to obtain a slurry having a $NaHCO_3$ concentration of from 350 to 600 g per liter, and the slurry is counter-currently contacted with steam at a temperature of at least 150° C. under bottom pressure of from 5 to 12 $kg/cm^2$ and top pressure of from 1 to 10 $kg/cm^2$ and decomposed in a single step to obtain anhydrous sodium carbonate in a suspended state (Japanese Examined Patent Publication No. 2652/1982).

This method is effective to some extent to facilitate the pyrolysis of the crude sodium bicarbonate or sodium sesquicarbonate and thereby to improve the conversion to the anhydrous sodium carbonate. However, it has a drawback that it requires a great amount of steam or heat energy for e.g. the mixing of the slurry in the vertical direction, and no consideration is taken into account from the viewpoint of the conservation of energy.

The present inventors have conducted various researches with an aim to obtain anhydrous sodium carbonate from sodium bicarbonate in good yield and with minimum energy, and have found it possible to attain the object by employing a multi-step process wherein the step of the pyrolysis of sodium bicarbonate is controlled to form a specific complex salt.

SUMMARY OF THE INVENTION

Thus, the present invention provides a process for producing anhydrous sodium carbonate by the pyrolysis of wet sodium bicarbonate, which comprises (a) a step of forming a complex salt selected from the group consisting of $Na_2CO_3.3NaHCO_3$ and $Na_2CO_3.NaHCO_3.2H_2O$ by the pyrolysis of wet sodium bicarbonate under such temperature and pressure conditions that said complex salt is stable, and (b) a step of forming anhydrous sodium carbonate by the pyrolysis of said complex salt under such temperature and pressure conditions that the anhydrous sodium carbonate is stable.

BRIEF DESCRIPTION OF THE DRAWINGS

Now, the present invention will be described in detail with reference to the preferred embodiments.

In the accompanying drawings.

DETAILED DESCRIPTION OF THE PREFERRED EMBODIMENTS

Figure 1:
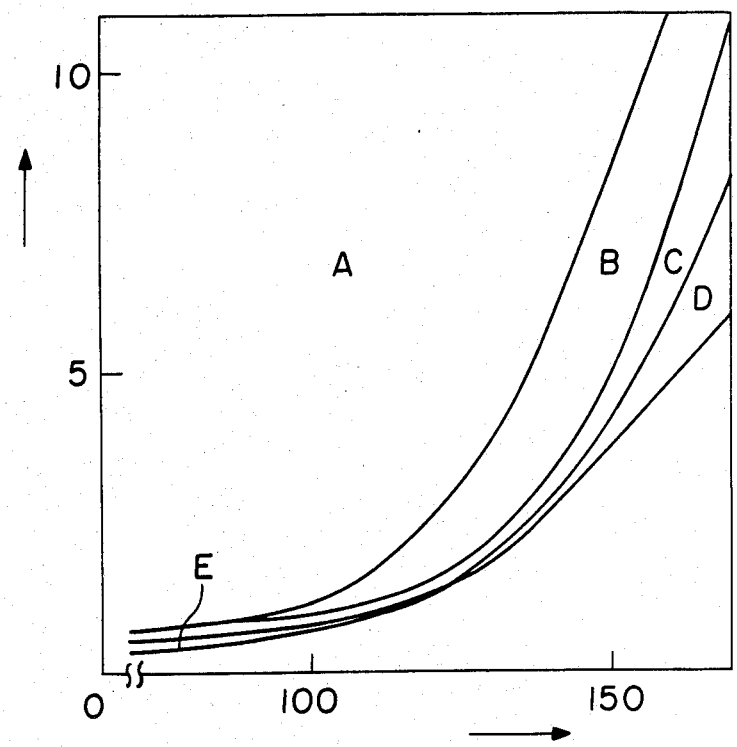
FIG. 1 is a phase equilibrium chart for carrying out the process of the present invention.

In the present invention, the wet sodium bicarbonate as the starting material may be obtained by the purification of a crude sodium bicarbonate obtained by a so-called ammonium chloride-soda coproduction method wherein ammonium chloride and sodium bicarbonate are alternately precipitated as crystals, respectively, or a so-called ammonia-soda method wherein only sodium bicarbonate is obtained as crystals and ammonium chloride is obtained in a form of a solution which is then distilled to recover and recycle ammonia. Otherwise, it may be obtained by the purification of a crude sodium bicarbonate obtained from natural trona. The former purified sodium bicarbonate is preferably the one obtained by the pyrolysis of a crude sodium bicarbonate containing ammonium carbonate as the major impurity.

The purification in the former case is usually conducted by subjecting the crude sodium bicarbonate to pyrolysis at a temperature sufficiently high to thermally decompose ammonium carbonate into carbon dioxide and ammonia, for instance, at a temperature of a level of from about 50° to about 100° C. under atmospheric pressure. It is preferred to employ carbon dioxide and steam generated by the pyrolysis of wet sodium bicarbonate, as will be described hereinafter.

The wet sodium bicarbonate thus obtained, is thermally decomposed to a complex salt with a composition represented by $Na_2CO_3.3NaHCO_3$ and/or $Na_2CO_3.NaHCO_3.2H_2O$ and finally to $Na_2CO_3$.

Preferred specific embodiments of the pyrolytic process of the present invention are represented by the following four reaction schemes:

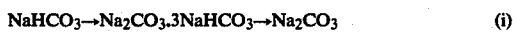
$NaHCO_3 \rightarrow Na_2CO_3.3NaHCO_3 \rightarrow Na_2CO_3$    (i)

$NaHCO_3 \rightarrow Na_2CO_3.NaHCO_3.2H_2O \rightarrow Na_2CO_3$    (ii)

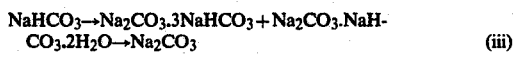
$NaHCO_3 \rightarrow Na_2CO_3.3NaHCO_3 + Na_2CO_3.NaHCO_3.2H_2O \rightarrow Na_2CO_3$    (iii)

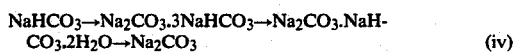
$NaHCO_3 \rightarrow Na_2CO_3.3NaHCO_3 \rightarrow Na_2CO_3.NaHCO_3.2H_2O \rightarrow Na_2CO_3$    (iv)

In the present invention, in order to conduct the pyrolysis via the respective complex salts as shown above, it is necessary to employ such conditions as to form such complex salts. As a result of the study, the present inventors have now found such conditions. Namely, such conditions are those shown by the graph in FIG. 1 of the attached drawings. In the graph, the ordinate represents the pressure (atm) in the reactor, and the abscissa represents the temperature (° C.). It has been found that the conditions for the formation of the respective complex salts are based on the temperature and the pressure shown in this graph.

Now, the present invention will be described in detail based on this discovery.

In the case where $Na_2CO_3.3NaHCO_3$ is to be formed, the temperature and pressure falling within the area B in the graph are employed. Whereas, in the case where $Na_2CO_3.NaHCO_3.2H_2O$ is to be formed as the complex salt, the temperature and pressure falling within the area C in the graph are employed.

In a case where a mixture of $Na_2CO_3.3NaHCO_3$ and $Na_2CO_3.NaHCO_3.2H_2O$ is to be formed as the complex salt, the temperature and pressure falling at the boundary of the areas B and C are employed.

Furthermore, in a case where $Na_2CO_3.3NaHCO_3$ is first formed as the complex salt, followed by the formation of $Na_2CO_3.NaHCO_3.2H_2O$, the above-mentioned corresponding conditions for the formation of the respective complex salts are employed independently.

For the formation of $Na_2CO_3$, the temperature and pressure conditions falling within the area D in the graph are employed irrespective of which conditions among the above are employed.

The area A in the graph represents the temperature and pressure ranges in which $NaHCO_3$ is stable, and the area E represents the temperature and pressure ranges in which $NaHCO_3.H_2O$ is stable.

For the formation of the above-mentioned complex salts and $Na_2CO_3$, it is necessary to employ the respective temperature and pressure conditions as mentioned above. These conditions are usually adjusted by carbon dioxide and steam. Carbon dioxide and steam are applied to each complex salt and $Na_2CO_3$. They may be supplied from the external energy source independent from the reaction system. However, in the present invention, it is one of the object to minimize the necessary energy, and accordingly, it is most preferred to utilize carbon dioxide and steam generated in each step for the formation of the complex salt or for the formation of $Na_2CO_3$, according to the present invention. In practice, it is advantageous to employ a method wherein carbon dioxide and steam generated in the formation of a complex salt or $Na_2CO_3$ are introduced directly to the pyrolytic step preceding the step for the formation of the complex salt or $Na_2CO_3$. In this case, it is unnecessary to recycle the entire amounts of the generated carbon dioxide and steam to the preceding step, and it is possible to recycle only a part thereof taking into account the balance of the materials and heat.

In this case, the temperature and pressure adjustment to obtain necessary conditions for maintaining the predetermined complex salt or $Na_2CO_3$ and for attaining the heat balance, can readily be made by controlling e.g. valves of the pipes for supplying carbon dioxide or steam.

When such a method of supplying carbon dioxide and steam is employed for carrying out the process of the present invention, there will be an advantage that no external other energy sources are required in any pyrolytic steps.

In the process of the present invention, the energy required for the pyrolysis is given successively in the order opposite to the order for the successive pyrolysis from the sodium bicarbonate to the anhydrous sodium carbonate. Namely, the initial heat source is given to the process for the formation of $Na_2CO_3$ as the final pyrolytic product, then transferred in the order opposite to the progress of the pyrolytic steps and finally sent to the pyrolytic step for the sodium bicarbonate. In the present invention, if the amount of steam discharged from the step for the pyrolysis of wet sodium bicarbonate is excessive, the energy is unnecessarily wasted correspondingly. The successive recycling of the generated carbon dioxide and steam to the respective preceding steps as mentioned above, is particularly advantageous also from the desirability to reduce the steam content in the gas discharged out of the system from the first step for the pyrolysis of wet sodium bicarbonate.

Further, when the wet sodium bicarbonate as the starting material is prepared by the purification of a crude sodium bicarbonate, it is advantageous to employ the carbon dioxide and steam discharged from the first step for the pyrolysis of wet sodium bicarbonate, as the heat source for the purification step. It is thereby possible to further reduce the steam content in the gas finally discharged.

The steam content in the gas finally discharged from the system is preferably at most 50% by volume, more preferably at most 40% by volume.

Thus, it is possible to conduct the pyrolysis with a minimum amount of heat energy while substantially maintaining the maximum conversion to anhydrous sodium carbonate.

As specific methods for carrying out the process of the present invention, there may be employed a method wherein the complex salt and/or $Na_2CO_3$ in the respective pyrolytic steps are formed as precipitates (so-called Bodenkerper in German), or a method wherein the solid in a wet state (e.g. in the form of a wet cake) is transformed to the complex salt and/or $Na_2CO_3$ in the respective pyrolytic steps.

In the present invention, the solid concentration in the reaction system in each step is preferably maintained within a range of from 10 to 80% by weight, more preferably from 10 to 60% by weight.

Now, the present invention will be described in further detail with referrence to the case where the wet sodium bicarbonate is the one obtained by the purification of a crude sodium bicarbonate obtained by an ammonia-soda method or an ammonium chloride-soda coproduction method, and the complex salt and $Na_2CO_3$ are formed as precipitates.

Various types of the reactors may be employed for carrying out the process of the present invention. However, it is preferred to employ a reactor of a complete mixing type in every pyrolytic step except for the step for the purification of a crude sodium bicarbonate where $NaHCO_3$ is formed as precipitates. For the purification step for the crude sodium bicarbonate, it is preferred, from the viewpoint of the efficiency, to employ an apparatus of pug mixer or ribbon mixer type wherein gas and solid are counter-currently contacted with each other.

In the present invention, there may be employed a relatively wide range of the slurry concentration of the respective precipitates. From the viewpoint of the mass production, it is advantageous that the slurry concentration of the product is as high as possible. However, from the practical point of view taking into account the deposition of scales to the heat exchangers, etc., the operation efficiency such as stirring, or the wearing of the apparatus due to the abrasion with the solid content, it is preferred to employ a low concentration. For this reason, for instance, in the case of an apparatus wherein $Na_2CO_3$ forms as precipitates, it is possible to conduct a smooth operation continuously by carrying out the formation of the precipitates at a low concentration, and the slurry is subjected to a liquid cyclone to obtain a product having a higher slurry concentration than the slurry in the reactor, and the separated liquid is recycled to the step for the formation of $Na_2CO_3$.

Such a process can, of course, be applied to other steps for the formation of the precipitates. In general, the solid concentration in the slurry in the reactor is preferably from 10 to 60% by weight in each step.

Now, the present invention will be described in further detail with reference to Examples. However, it should be understood that the present invention is by no means restricted by these specific Examples.

EXAMPLE 1

Figure 2:
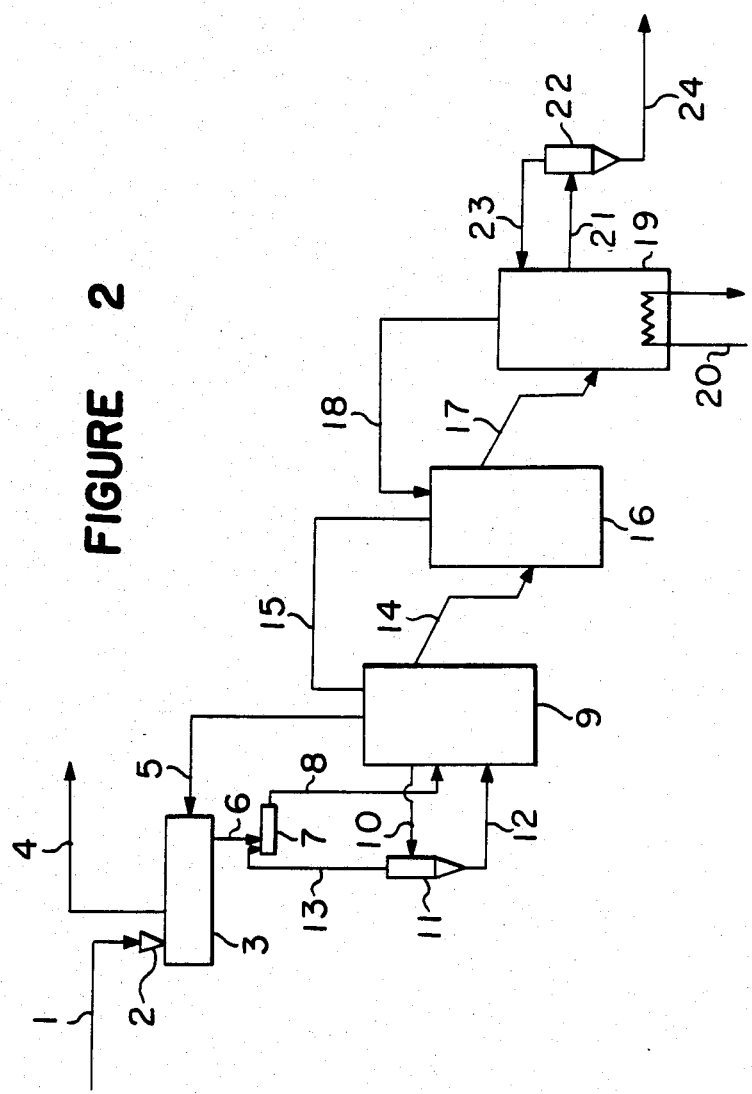
FIG. 2 is a flow chart of an embodiment of the process of the present invention.

FIG. 2 is a flow chart illustrating an embodiment of the process of the present invention. A crude sodium bicarbonate 1 (composition: $NaHCO_3$ 81.0%, $Na_2CO_3$ 0.8%, $NH_4HCO_3$ 4.1%, $NaCl$ 0.3%, $H_2O$ 14.0%) obtained by an ammonia-soda method was fed into a reactor 3 of pug mixer type via a feeder 2 at a constant rate of 1895 kg/hr and thoroughly contacted with gas mixture 5 ($CO_2$: 42.8 vol %, $H_2O$: 57.2 vol %) generated at a rate of 590 kg/hr from a reactor 9. The temperature inside the reactor 3 was 75° C., and the gas 4 ($CO_2$: 66.4 vol %, $H_2O$: 33.6 vol %) discharged from the reactor 3 was 520 kg/hr. The slurry 6 was discharged from the reactor 3 at a rate of 1910 kg/hr, and the slurry concentration was 76.5% by weight. To this slurry, the supernatant 13 obtained by subjecting the slurry 10 from the reactor 9 to a liquid cyclone 11 was added at a rate of 330 kg/hr to obtain a slurry 8 having a slurry concentration of 65.0% by weight. The slurry 8 was supplied to the reactor 9 via a pump 7. The reactor 9 is a complete mixing type reactor having an internal circulation system, to which a gas mixture 15 ($CO_2$: 17.0 vol %, $H_2O$: 83.0 vol %) generated at a rate of 665 kg/hr from the reactor 16 was supplied. The reator 9 was controlled by an automatic control system to have an inner temperature of 130° C. and a pressure of 3.15 atm. The slurry 14 discharged from the reactor 9 contained $Na_2CO_3$.$3NaHCO_3$ as precipitates. The slurry was discharged at a rate of 1980 kg/hr and the slurry concentration was 50.5% by weight. This slurry 14 was supplied to the reactor 16 by the head difference. The reactor 16 was a reactor of the same type as the reactor 9. A gas mixture 18 ($CO_2$:9.2 vol %, $H_2O$: 90.8 vol %) generated at a rate of 620 kg/hr from the reactor 19 was supplied to the reactor 16. The reactor 16 was controlled by an automatic control system to have an internal temperature of 140° C. and a pressure of 3.30 atm. The slurry 17 discharged from the reactor 16 contained $Na_2CO_3$.$NaHCO_3$.$2H_2O$ as precipitates and had a slurry concentration of 52.2% by weight, and the flow rate was 1930 kg/hr. This slurry 17 was supplied to the reactor 19 by the head difference. The reactor 19 was a reactor of the same type as the reactor 9. For the heating of the reactor 19, 30 ata steam 20 at a flow rate of 780 kg/hr was employed. The reactor 19 was also controlled by an automatic control system to have a temperature of 150° C. and a pressure of 3.90 atm. The slurry 21 discharged from the reactor 19 contained $Na_2CO_3$ as precipitates and had a slurry concentration of 30% by weight, and the flow rate was about 3000 kg/hr. This slurry 21 was separated by a liquid cyclone 22 into a concentrated slurry 24 having a flow rate of 1310 kg/hr and a supernatant 23 having a flow rate of 1850 kg/hr. The supernatant was returned to the reactor 19, and the concentrated slurry was withdrawn. The withdrawn slurry had the following composition:

| | |
|---|---|
| $Na_2CO_3$ | 927 kg/hr |
| $NaHCO_3$ | 61 kg/hr |
| $H_2O$ | 318 kg/hr |
| $NaCl$ | 4 kg/hr |

The pyrolysis rate was 96.0% based on the feed sodium bicarbonate.

Further, in this Example, the energy required for the formation of 1 kg of $Na_2CO_3$ was 399 kcal. Whereas, the energy required in the Examples of Japanese Examined Patent Publication No. 2652/1982 is 498 kcal, and in the case where the conventional STD is used, the required energy is 594 kcal.

EXAMPLE 2

Figure 3:
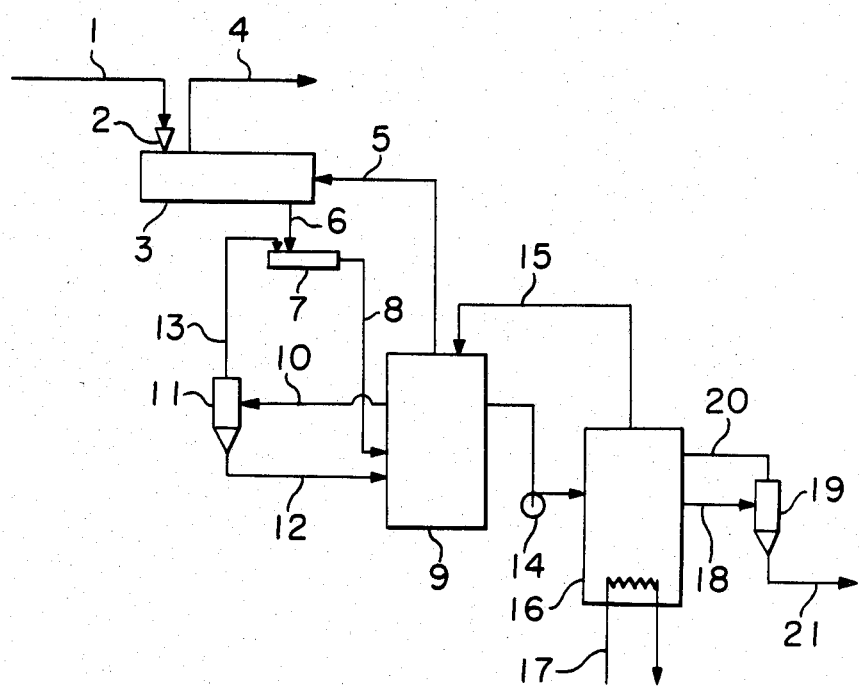
FIG. 3 is a flow chart of another embodiment of the process of the present invention.

FIG. 3 is a flow chart illustrating another embodiment of the process of the present invention. A crude sodium bicarbonate 1 (composition: $NaHCO_3$ 81.0%, $Na_2CO_3$ 0.8%, $NH_4HCO_3$ 4.1%, $NaCl$ 0.3%, $H_2O$ 14.0%) prepared by an ammonia-soda method was fed to a reactor 3 of pug mixer type by a table feeder 2 at a constant rate of 1890 kg/hr, and thoroughly contacted with a gas mixture 5 ($CO_2$: 41.1 vol %, $H_2O$: 58.9 vol %) generated at a rate of 595 kg/hr from the reactor 9. The temperature inside the reactor 3 was 75° C., and the gas 4 ($CO_2$: 66.4 vol %, $H_2O$: 33.6 vol %) discharged from the reactor was 515 kg/hr. The slurry 6 was discharged from the reactor at a rate of 1930 kg/hr, and the slurry concentration was 74.9% by weight. To this slurry, a supernatant 13 obtained by subjecting the slurry from the reactor 9 to a liquid cyclone 11, was added at a rate of 290 kg/hr to obtain a slurry 8 having a slurry concentration of 65.0% by weight. The slurry 8 was supplied to the reactor 9 via a pump 7. The reactor 9 was a complete mixing type reactor having an internal circulation system, to which a gas mixture 15 ($CO_2$: 15.8 vol %, $H_2O$ : 84.2 vol %) generared from reactor 16 was supplied at a rate of 685 kg/hr to bring the internal temperature of the reactor 9 to 130° C. The internal pressure of the reactor 9 was adjusted to 3.10 atm by controlling the discharge gas valve of the reactor. The slurry discharged from the reactor 9 contained $Na_2CO_3$.$3NaHCO_3$ as precipitates and had a slurry concentration of 48.1% by weight, and the flow rate was 2020 kg/hr. This slurry was supplied to the reactor 16 by a pump 14. The reactor 16 was a reactor of the same type as the reactor 9, and 30 ata steam 17 was employed for the heating of the reactor 16. The flow rate of this steam was controlled by an automatic control system so that the temperature inside the reactor 16 was maintained at a level of 170° C. The average amount of the steam used for this operation was 834 kg/hr. Further, the internal pressure of the reactor 16 was controlled by a discharge gas valve to a level of 6.1 atm. The slurry 18 discharged from the reactor 16 contained $Na_2CO_3$ as precipitate and had a slurry concentration of 30% by weight, and the flow rate was 2700 kg/hr. This slurry 18 was separated by a liquid cyclone 19 into a concentrated slurry 21 and a supernatant 20. The supernatant was returned to the reactor 16. The concentrated slurry thereby obtained had the following composition:

| Na$_2$CO$_3$ | 915 kg |
| NaHCO$_3$ | 83 kg |
| H$_2$O | 340 kg |
| NaCl | 4 kg |

The pyrolysis rate was 94.6% based on the feed sodium bicarbonate.

Further, in this Example, the energy required for the formation of 1 kg of Na$_2$CO$_3$ was 407 kcal.

EXAMPLE 3

In FIG. 3, a crude sodium bicarbonade 1 (composition: NaHCO$_3$ 81.0%, Na$_2$CO$_3$ 0.8%, NH$_4$HCO$_3$ 4.1%, NaCl 0.3%, H$_2$O 14.0%) prepared by an ammonia-soda method was fed to a reactor 3 of pug mixer type by a table feeder 2 at a constant rate of 1890 kg/hr, and thoroughly contacted with a gas mixture 5 (CO$_2$ 42.0 vol %, H$_2$O: 58.0 vol %) generated at a rate of 592 kg/hr from the reactor 9. The temperature inside the reactor 3 was 75° C., and the gas 4 (CO$_2$ 66.4 vol %, H$_2$O: 33.6 vol %) discharged from the reactor was 520 kg/hr. The slurry 6 discharged from the reactor was 1920 kg/hr and had a slurry concentration of 75.2% by weight. To this slurry, a supernatant 13 obtained by subjecting the slurry from the reactor 9 to a liquid cyclone 11, was added at a rate of 300 kg/hr to obtain a slurry 8 having a slurry concentration of 65.0% by weight. The slurry 8 was supplied to the reactor 9 by a pump 7. The reactor 9 was a complete mixing type reactor having an internal circulation system, to which a gas mixture 15 (CO$_2$: 15.6 vol %, H$_2$O: 84.4 vol %) generated from the reactor 16 was supplied at a flow rate of 700 kg/hr to bring the internal temperature of the reactor 9 to 170° C. The internal pressure of the reactor 9 was adjusted to a level of 9.5 atm by controlling the discharge gas valve of the reactor. The slurry discharged from the reactor 9 contained Na$_2$CO$_3$.NaHCO$_3$.2H$_2$O as precipitates and had a slurry concentration of 45.4% by weight, and the flow rate was 2030 kg/hr. This slurry was supplied to the reactor 16 by a pump 14. The reactor 16 was a reactor of the same type as the reactor 9, and 30 ata steam 17 was employed for the heating of the reactor 16. The flow rate of this steam was controlled by an automatic control system to bring the internal temperature of the reactor 16 to a level of 200° C. The average amount of the steam used for this operation was 931 kg/hr. Further, the internal pressure of the reactor 16 was controlled by a discharge gas valve to a level of 10.1 atm. The slurry discharged from the reactor 16 contained Na$_2$CO$_3$ as precipitates and had a slurry concentration of 30% by weight, and the flow rate was 2800 kg/hr. This slurry 18 was separated by a liquid cyclone 19 into a concentrated slurry 21 and a supernatant 20. The supernatant was returned to the reactor 16. The concentrated slurry thus obtained had the following composition:

| Na$_2$CO$_3$ | 924 kg |
| NaHCO$_3$ | 70 kg |
| H$_2$O | 340 kg |
| NaCl | 4 kg |

The pyrolysis rate was 95.4% based on the feed sodium bicarbonate.

Further, in this Example, the energy required for the formation of 1 kg of Na$_2$CO$_3$ was 427 kcal.

EXAMPLE 4

Figure 4:
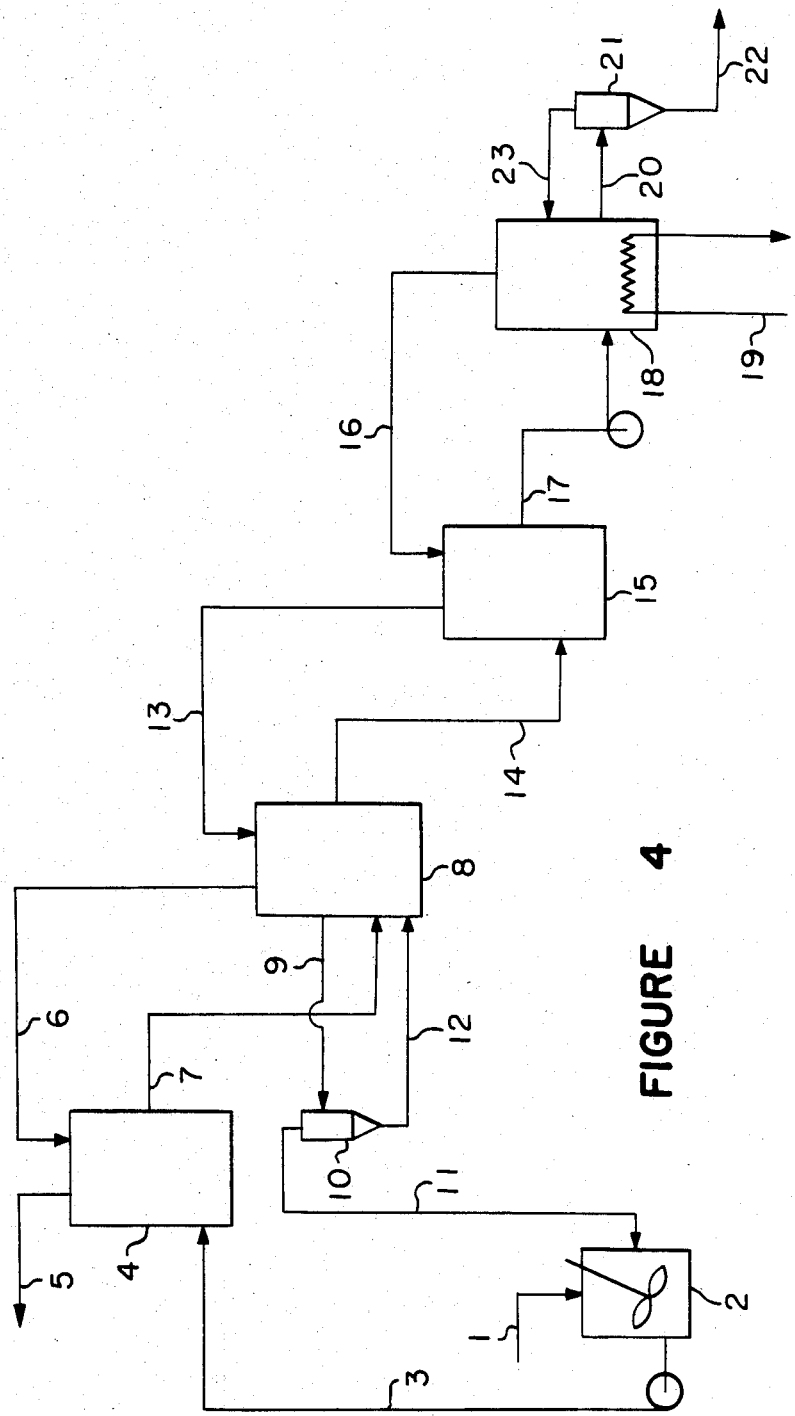
FIG. 4 is a flow chart of still another embodiment of the process of the present invention.

In FIG. 4, a wet sodium bicarbonate 1 (composition: NaHCO$_3$ 85.4%, H$_2$O 13.9%, NaCl 0.4%, Na$_2$SO$_4$ 0.3%) prepared by carbonating a solution of sodium bicarbonate and sodium carbonate containing impurities such as NaCl and Na$_2$SO$_4$, was supplied at a rate of 1840 kg/hr and a supernatant 11 obtained by subjecting the slurry 9 from the reactor 8 to a liquid cyclone 10, was supplied at a rate of 1100 kg/hr to a mixing tank 2 equipped with a stirrer. They were thoroughly mixed to obtain a slurry 3 having a slurry concentration of 56.0% by weight. This slurry was supplied to the reactor 4. The reactor 4 was a complete mixing type reactor having an internal circulation system, to which a gas mixture 6 (CO$_2$: 46.3 vol %, H$_2$O: 53.7 vol %) generated at a rate of 606 kg/hr from the reactor 8 was supplied, whereby the internal temperature of the reactor 4 became 115° C. The internal pressure of the reactor 4 was adjusted to a level of 3.2 atm by a discharge gas valve. The gas (CO$_2$:60.1 vol %, H$_2$O: 39.9 vol %) was discharged from the reactor 4 at a rate of 511 kg/hr. The slurry 7 discharged from the reactor contained NaHCO$_3$ as precipitates and had a slurry concentration of 50.3% by weight, and the flow rate was about 2980 kg/hr. This slurry 7 was supplied to the reactor 8 by the head difference. The reactor 8 was a reactor of the same type as the reactor 4, to which a gas mixture 13 (CO$_2$: 19.6 vol %, H$_2$O: 80.4 vol %) generated at a rate of 644 kg/hr from the reactor 15 was supplied. The reactor 8 was controlled by an automatic control system to have an internal temperature of 130° C. and a pressure of 3.45 atm. The slurry 14 discharged from the reactor 8 contained Na$_2$CO$_3$.3NaHCO$_3$ as precipitates and had a slurry concentration of 54.2% by weight, and the flow rate was about 1918 kg/hr. This slurry 14 was supplied to the reactor 15 by the head difference. The reactor 15 was a reactor of the same type as the reactor 4, to which a gas mixture 16 (CO$_2$:10.7 vol % H$_2$O: 89.3 vol %) generated at a rate of 609 kg/hr from the reactor 18 was supplied. The reactor 15 was controlled by an automatic control system to have an internal temperature of 145° C. and a pressure of 3.8 atm. The slurry 17 discharged from the reactor 15 contained Na$_2$CO$_3$.NaHCo$_3$. 2H$_2$O as precipitates and had a slurry concentration of 55.1% by weight, the flow rate was about 1883 kg/hr. This slurry 17 was supplied to the reactor 18 by a pump. The reactor 18 was a reactor of the same type as the reactor 4, and 30 ata steam 19 at a flow rate of 751 kg/hr was employed for the heating of the reactor 18. The reactor 18 was also controlled by an automatic control system to have an internal temperature of 155° C. and a pressure of 4.5 atm. The slurry 20 discharged from the reactor 18 contained Na$_2$CO$_3$ as precipitates and had a slurry concentration of 30% by weight, and the flow rate was about 2800 kg/hr. This slurry 20 was separated by a liquid cyclone 21 into a concentrated slurry 22 and a supernatant 23. The supernatant was returned to the reactor 18. The concentrated slurry thus obtained had the following composition.

| Na$_2$CO$_3$ | 929 kg/hr |
| NaHCO$_3$ | 62 kg/hr |
| H$_2$O | 300 kg/hr |
| NaCl | 7 kg/hr |
| Na$_2$SO$_4$ | 6 kg/hr |

The pyrolysis rate was 96.1% based on the feed sodium bicarbonate.

Further, in this Example, the energy required for the formation of 1 kg of $Na_2CO_3$ was 384 kcal.

We claim:

1. A process for producing anhydrous sodium carbonate by the decarbonization of a sodium bicarbonate slurry, said process comprising:

using at least two reaction vessels, and
- (i) forming a complex salt selected from the group consisting of $Na_2CO_3.3NaHCO_3$ and $Na_2CO_3.NaHCO_3.2H_2O$, in a first reaction vessel, by the decarbonization of a sodium bicarbonate slurry under such temperature and pressure conditions as indicated by areas B or C of FIG. 1, wherein the energy required for the said decarbonization is supplied by using a controlled amount of (a) carbon dioxide generated in step (iii), or (b) steam generated in step (iii), or (c) carbon dioxide and steam generated in step (iii), said carbon dioxide or steam being used in a quantity sufficient to maintain the temperature and pressure conditions of areas B or C of FIG. 1,
- (ii) supplying a slurry containing the said complex salt to a second reaction vessel, and
- (iii) forming anhydrous sodium carbonate by the decarbonization of the said complex salt conducted by directly supplying steam under such temperature and pressure conditions as indicated by area D of FIG. 1.

2. The process according to claim 1, wherein the solid concentration in the reaction system in each of steps (i) and (iii) is from 10 to 80% by weight.

3. The process according to claim 2, wherein the solid concentration in the reaction system in each of steps (i) and (iii) is from 10 to 60% by weight.

4. The process according to claim 1, wherein the sodium bicarbonate is the one obtained by the purification of a crude sodium bicarbonate obtained by an ammonia-soda method or a coproduction method of ammonium chloride and soda, or of a crude sodium bicarbonate obtained from natural trona.

5. The process according to claim 4, wherein the purification of the crude sodium bicarbonate is conducted by carbon dioxide and/or steam generated in step (i).

6. The process according to claim 5, wherein in the purification of the crude sodium bicarbonate, the steam content in the gas to be discharged out of the system is at most 50% by volume.

7. A process for producing anhydrous sodium carbonate by the decarbonization of a sodium bicarbonate slurry, said process comprising:

- (i) forming $Na_2CO_3.3NaHCO_3$ in a first reaction vessel by the decarbonization of a sodium bicarbonate slurry under such temperature and pressure conditions as indicated by area B of FIG. 1, wherein the energy required for the said decarbonization is supplied by using a controlled amount of (a) carbon dioxide generated in step (iii), or (b) steam generated in step (iii), or (c) carbon dioxide and steam generated in step (iii), said carbon dioxide or steam being used in a quantity sufficient to maintain the temperature and pressure conditions of area B of FIG. 1;
- (ii) supplying the slurry containing $Na_2CO_3.3NaHCO_3$ from (i) to a second reaction vessel
- (iii) forming $Na_2CO_3.NaHCO_3.2H_2O$ in the said second reaction vessel by the pyrolysis of $Na_2CO_3.3NaHCO_3$ under such temperature and pressure conditions as indicated by area C of FIG. 1, wherein the energy required for the said pyrolysis is supplied by using a controlled amount of (a) carbon dioxide generated in step (V), or (b) steam generated in step (V), or (c) carbon dioxide and steam generated in step (V), or said carbon dioxide or steam being used in a quantity sufficient to maintain the temperature and pressure conditions of area C of FIG. 1;
- (iv) supplying the slurry containing $Na_2CO_3.NaHCO_3.2H_2O$ from (iii) to a third reaction vessel
- (v) forming anhydrous sodium carbonate in the said third reaction vessel by the decarbonization of $Na_2CO_3.NaHCO_3.2H_2O$ conducted by directly supplying steam under such temperature and pressure conditions as indicated by area D of FIG. 1.

* * * * *